United States Patent [19]

Meller et al.

[11] Patent Number: 5,729,565
[45] Date of Patent: Mar. 17, 1998

[54] DISCHARGE UNIT AND ELECTRODE FOR A PULSED DISCHARGE LASER

[75] Inventors: Anton Meller; Frank Voss, both of Göttingen, Germany

[73] Assignee: Lambda Physik Gesellschaft zur Herstellung von Lasern MBH, Germany

[21] Appl. No.: 827,973

[22] Filed: Nov. 7, 1996

Related U.S. Application Data

[63] Continuation of Ser. No. 627,000, Apr. 3, 1996, abandoned, which is a continuation of Ser. No. 285,063, Aug. 3, 1994, abandoned.

[51] Int. Cl.$^6$ ................................................ H01S 3/097
[52] U.S. Cl. ................................................ 372/87; 372/57
[58] Field of Search .................... 378/87, 57, 55, 378/58

[56] References Cited

U.S. PATENT DOCUMENTS

| | | | |
|---|---|---|---|
| 4,085,385 | 4/1978 | Fein et al. | 372/87 |
| 4,860,300 | 8/1989 | Bauemler et al. | 372/57 |
| 5,062,116 | 10/1991 | Christensen | 372/61 |
| 5,187,716 | 2/1993 | Haruta et al. | 372/57 |

FOREIGN PATENT DOCUMENTS

| | | |
|---|---|---|
| 464841A2 | 1/1992 | European Pat. Off. . |
| 3632995A1 | 4/1987 | Germany . |
| 3920634A1 | 1/1991 | Germany . |

OTHER PUBLICATIONS

"Performance Characteristics of Sealed–Off $CO_2$ Laser with $La_{1-x}Sr_x CoO_3$ Oxide Cathode", by N. Lehisa et al., J. Appl. Phys. 59(2), Jan. 15, 1986, pp. 317–323.

"Kommerzielle Excimerlaser", by H. Pummer et al., Laser und Optoelektronik, Sonderdruck vol. 17(2), pp. 141–148 (1985).

Primary Examiner—Leon Scott, Jr.
Attorney, Agent, or Firm—Limbach & Limbach L.L.P.

[57] ABSTRACT

An electrode for a gas discharge laser. Electrodes which consist, at least in part, of zirconium are suggested for use in gas discharge lasers containing fluorine.

8 Claims, 1 Drawing Sheet

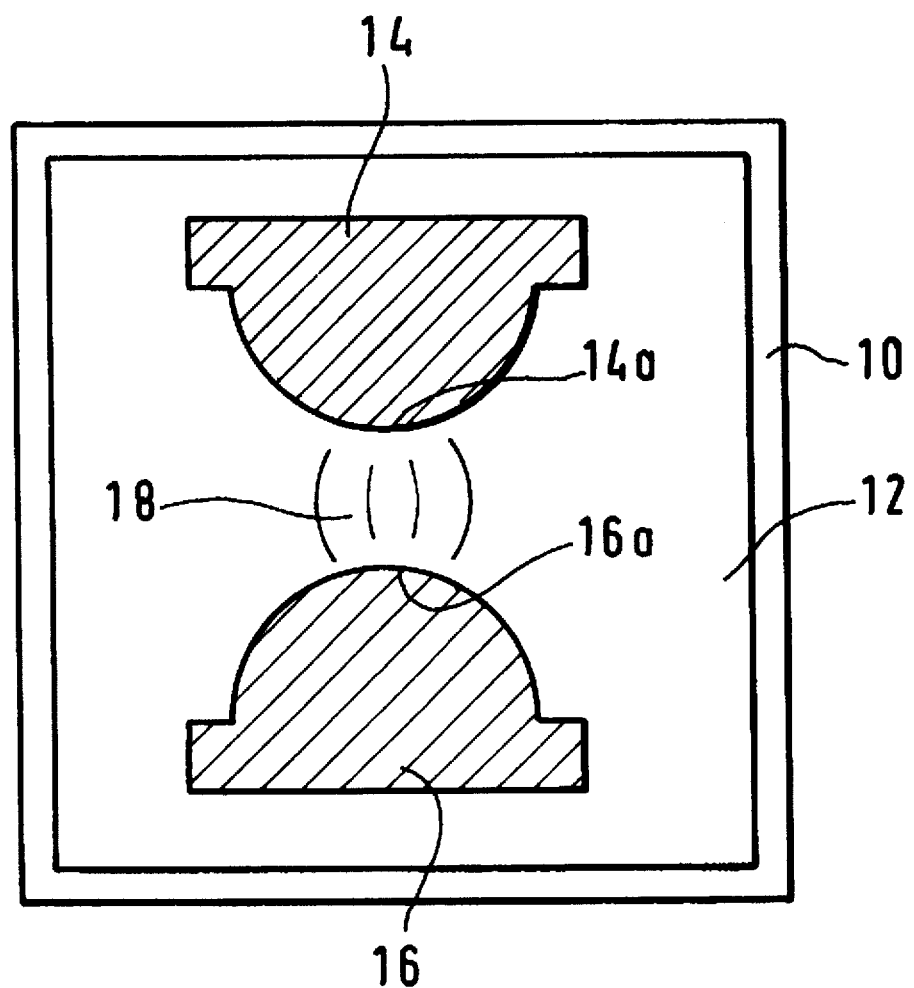

DISCHARGE UNIT AND ELECTRODE FOR A PULSED DISCHARGE LASER

This application is a continuation of Ser. No. 08/627,000 Apr. 3, 1996 now abandoned which is a continuation of application Ser. No. 08/285,063, filed on Aug. 3, 1994 now abandoned.

FIELD OF THE INVENTION

The instant invention relates to an electrode in a discharge unit containing fluorine of a pulsed gas discharge laser.

More specifically, the invention is concerned with electrodes for gas discharge lasers which contain fluorine gas in their discharge chambers. These are especially lasers in the gas discharge of which so-called exciplexes or (more rarely) trimers occur, in other words excited rare gas halides which are stable in excited states only so that a transition into the non-bound state takes place upon stimulated emission. The excited noble gas halides often are referred to as "excimers". In the true sense of the word, however, that is not quite correct because actually the term refers to nothing but electronically excited molecules of rare gases, e.g. $Ar_2^*$, $Kr_2^*$, and $Xe_2^*$.

Chemical lasers, too, in the gas discharge of which $F_2$ takes part, are suitable for electrodes according to the invention to be used. These may be, for instance, hydrogen fluoride lasers in which a gas mixture in a discharge chamber, consisting of hydrogen ($H_2$) and fluorine ($F_2$), is subjected to gas discharge, including the participation of certain additional gases, whereby excited hydrogen fluoride molecules are formed.

The electrodes according to the invention are useful also with $F_2$ lasers.

Gas discharge lasers comprise a laser chamber or resonator chamber which is filled with a so-called active or operating gas (also called laser gas) and in which two electrodes normally are disposed parallel to the optical axis of a laser resonator. The function of these electrodes is to assure the so-called principal or main discharge of the laser, and between them the gas discharge is fired. Before initiation of the main discharge, the active gas is subjected to so-called pre-ionization in order to achieve an effective excitation of the active gas. This means that from $10^5$ to $10^8$ free electrons per $cm^3$ are generated in the laser gas by pre-ionization before the main discharge begins. It is known to provide separate electrodes for this pre-ionization and to fire sparks between them. These electrodes which are provided for pre-ionization usually are referred to as auxiliary electrodes.

The invention relates to substances which are useful both for the main discharge electrodes and the auxiliary electrodes of gas discharge lasers. The materials according to the invention are especially well suited for gas discharge lasers in which fluorine is utilized. Yet the electrodes according to the invention are suitable also for lasers which do not make use of fluorine as their gas, but instead work with chlorine for example.

Active gas mixtures for excimer lasers (or more precisely: exciplex lasers) thus contain not only noble gases but also a halogen component or a halogen donor, such as $F_2$, $NF_3$, HCl, etc. At an overall pressure of from 1.5 to 10 bars, the halogen concentration is from 0.1 to 0.5%. This gas mixture is introduced between two elongated, parallel main discharge electrodes and subjected to high voltage discharge. Very high current densities, typically of $10^3$ A/$cm^2$, power densities of $10^6$ W/$cm^3$, and electron temperatures in the range of 1 eV to 4 eV are required in the high voltage discharge in order to obtain high energy laser pulses. For this reason the whole discharge unit is subjected to very severe stress.

The gas discharge always leads to more or less strong erosion of the electrodes, and the erosion products enter into chemical reaction with the halogen. The electrode erosion products become available either as particles or as volatile metal halides. Particles cause deposits of dust and that is particularly undesirable in conjunction with the laser optics. Volatile metal halides, on the other hand, can lead to the formation of metal films on the optical components of the laser unit due to photochemical processes caused by the laser radiation itself and again that is very detrimental to the functioning of the laser.

The material of the electrodes, therefore, is decisive not only as regards the service life of the electrodes themselves whose shape and spacing varies with the erosion of the electrodes. It is decisive also for the lifetime of the laser gas and the laser optical system.

BACKGROUND OF THE INVENTION

In the prior art, the electrodes mostly used are made of nickel and sometimes of brass. Likewise known are aluminum electrodes with a nickel coating (H. Pummer, U. Sowada, P. Oesterlin, U. Rebhan, D. Basting, Laser und Optoelektronik 17, (1985) 141). Alloys of copper/aluminum and nickel as well as tungsten/copper alloys are likewise known materials for electrodes (DE-OS 38 17 145).

Electrodes containing tungsten as the major component have a much greater durability than those with the standard nickel ingredient. Yet they cannot be used together with laser gases which contain fluorine.

DE-39 20 634 A1 describes electrodes for excimer lasers which contain a metal of the platinum group or gold as one component at least in the area which is exposed to the gas discharge or to a pre-ionization spark. That is especially advantageous when gases containing fluorine are used.

U.S. Pat. No. 4,085,385 lists a number of metals and alloys for use as electrode material in continuous gas discharge lasers without, however, offering any experimental details or indicating any results in respect of the many substances mentioned. Among others, also zirconium (Zr) is named as an electrode material. Yet U.S. Pat. No. 4,085,385 teaches that electrodes of this kind should be covered by a special protective coating (zirconium oxide) at least in their area which is exposed to the gas discharge. This protective cover is applied to the electrode in a separate step. This prior publication consequently teaches that an electrode made of zirconium (or hafnium) is not suitable for a gas discharge laser unless specifically prepared with a protective coating or covered by a special layer. Moreover, this prior publication fails to address the particular problems of excimer lasers, especially that of the fluorine compatibility of the electrodes of lasers of that kind.

Contrary to the instant application, U.S. Pat. No. 4,085,385 relates to continuous gas discharge lasers. The current densities in continuous gas discharge lasers are smaller by orders of magnitude than in pulsed gas discharge lasers and, accordingly, also the cathode erosion caused by the so-called sputtering is much less severe in a continuous gas discharge laser. If a material is suitable for the electrodes of a continuous gas discharge laser, this may not lead one to the conclusion that it is likewise suitable for pulsed gas discharge lasers, especially not for excimer lasers and other pulsed high pressure gas lasers (cf. U.S. Pat. No. 4,085,385, column 5, line 42 to column 6, line 8).

The problems involved in the provision of electrodes for excimer lasers (also referring, in that context, to exciplex lasers) of which the discharge tube, including the optical components have a long service life (durability) are discussed in detail in U.S. Pat. No. 5,187,716 (corresponding to EP 0 464 841 A2). A variety of metals are suggested as material for the electrodes, especially alloys of platinum with rhodium, ruthenium, iridium, and osmium. Also in that publication, a protective layer on the metal body of the electrode is believed to be very advantageous for the life of the electrode, and especially zirconium oxide ($ZrO_2$) is provided for the etching resistive protective layer.

SUMMARY OF THE INVENTION

It is the object of the invention to provide electrodes for a gas discharge laser which offer a long service life of the laser even if fluorine is used as a component of the laser active gas. The electrode according to the invention is to be such as to make it possible to produce the laser economically and to permit the laser to be operated also with gases other than fluorine (e.g. chlorine).

To meet the object outlined above, an electrode for a pulsed gas discharge laser is suggested which is made at least in part of zirconium.

Electrodes according to the invention, in particular, are advantageous for use in pulsed high pressure gas lasers, in other words lasers in which the gas pressures of the active gas in the chamber correspond to those of a pulsed excimer laser.

Surprisingly, it was found that such zirconium electrodes, when used as the main electrodes in the excimer laser, can prolong the service life (durability) of the laser by as much as 300% as compared to conventional electrodes (made, for instance, of nickel, copper, or brass, etc.). The electrodes thus are little susceptible to erosion (sputtering), and little contamination occurs of the optical elements of the laser resonator, especially of the windows. Moreover, it was found that the consumption of fluorine is less when zirconium electrodes are used instead of electrodes which are made of the conventional materials.

It is not necessary to apply a protective coating on the zirconium in a separate process step or to cover the electrodes with a protective layer in those sections which are exposed to the gas discharge.

Apart from being used for the main electrodes of a gas discharge laser, zirconium can be used to advantage also for pre-ionization electrodes.

Other suitable materials for the electrodes of a gas discharge laser, instead of zirconium, are yttrium, hafnium, and lanthanum, all providing advantages similar to those described above with respect to zirconium.

Instead of using pure zirconium, yttrium, hafnium, or lanthanum, alloys of these elements with one another or with third metals also can be used. Especially well suited are the zirconium alloys which are commercially available under the designation "Zircalloy 2, 3, 4 . . . " containing a few percentage points (up to 1.7%) of Sn, Se, Cr, and/or Ni. The alloy zircon-niob which is available on the market is suitable as well.

In a preferred modification of the invention, a material whose electron work function is less than that of other components of the electrode is added to the electrode. This material having a rather low electron work function, e.g. less than 4 eV, particularly can be located in "islands" in the electrode surface.

BRIEF DESCRIPTION OF THE DRAWING

An embodiment of the invention will be specified in greater detail below, with reference to the accompanying drawing.

The only FIGURE is a diagrammatic sectional elevation of a gas excimer laser comprising two electrodes for the principal discharge.

DESCRIPTION OF THE PREFERRED EMBODIMENT

The interior 12 of a chamber 10 of the gas discharge laser is filled with the working gas or active gas of the laser. A gas discharge 18 is fired between two main electrodes 14, 16. Those skilled in the art are familiar with gas discharge lasers, especially those containing fluorine in the active gas, so that they need not be specified in detail here. Any known electrode configuration may be applied.

In the embodiment shown, the electrodes 14, 16 are solidly made of zirconium. Zirconium of a technical degree of purity has proved to be especially well suited for use together with laser gases containing fluorine. The service life of the laser (number of laser pulses emitted) was determined to be prolonged by a factor of 3, as compared to conventional electrodes made of Cu, Al, or Ni or their alloys, when laser gases were used which contained fluorine.

It is likewise possible to use zirconium alloys instead of pure zirconium.

What is decisive is that at least those sections 14a and 16a of the electrodes which are directly exposed to the gas discharge 18 are made of zirconium or an alloy thereof.

If a thin oxide film should have formed on the zirconium during storage, it will be removed by the gas discharge.

What is claimed is:

1. A high pressure excimer or molecular laser comprising:
   a chamber for holding a gas mixture;
   a gas mixture, located in said chamber, said mixture including a halogen gas selected from the group consisting of fluorine and chlorine, wherein said lasing gas mixture has a pressure in excess of 1.5 bar; and
   a pair of electrodes located within said chamber for generating a pulsed gas discharge therebetween and wherein said electrodes are formed from a substantially non-oxidized and uncoated material selected from the group consisting of zirconium, yttrium, hafnium, lanthanum and alloys thereof.

2. A laser as recited in claim 1 which is an excimer laser and wherein said gas mixture includes a rare gas.

3. A laser as recited in claim 2 wherein said halogen is fluorine.

4. A laser as recited in claim 3 wherein said electrodes are formed from zirconium.

5. A laser as recited in claim 2 wherein said halogen is chlorine.

6. A laser as recited in claim 5 wherein said chlorine is in the form of HCl prior to excitation of the gas mixture.

7. A laser as recited in claim 1 wherein said electrodes are formed of a zirconium alloy.

8. A laser as recited in claim 7 wherein the zirconium alloy comprises zirconium and a few percentage points of a material selected from the group consisting of Sn, Se, Cr and Ni.

* * * * *